United States Patent Office 3,379,967
Patented Apr. 23, 1968

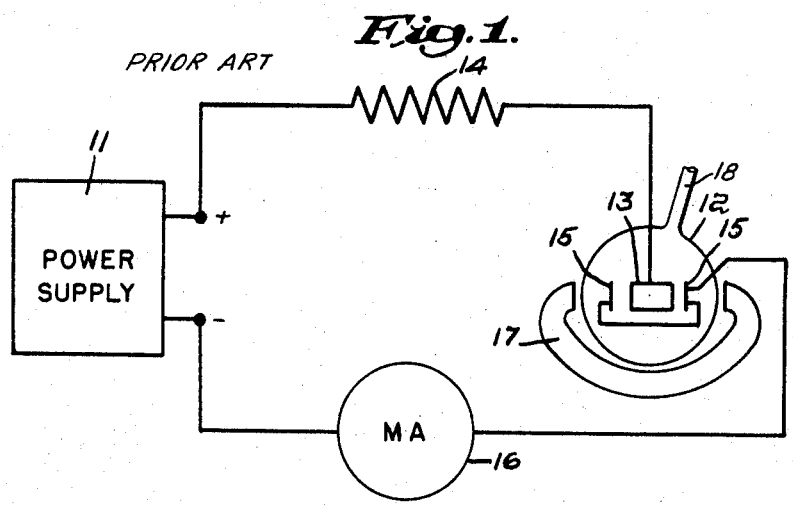
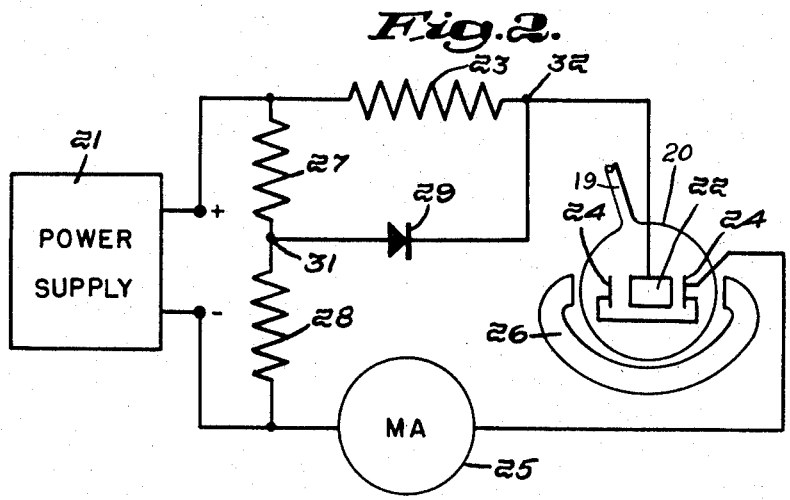

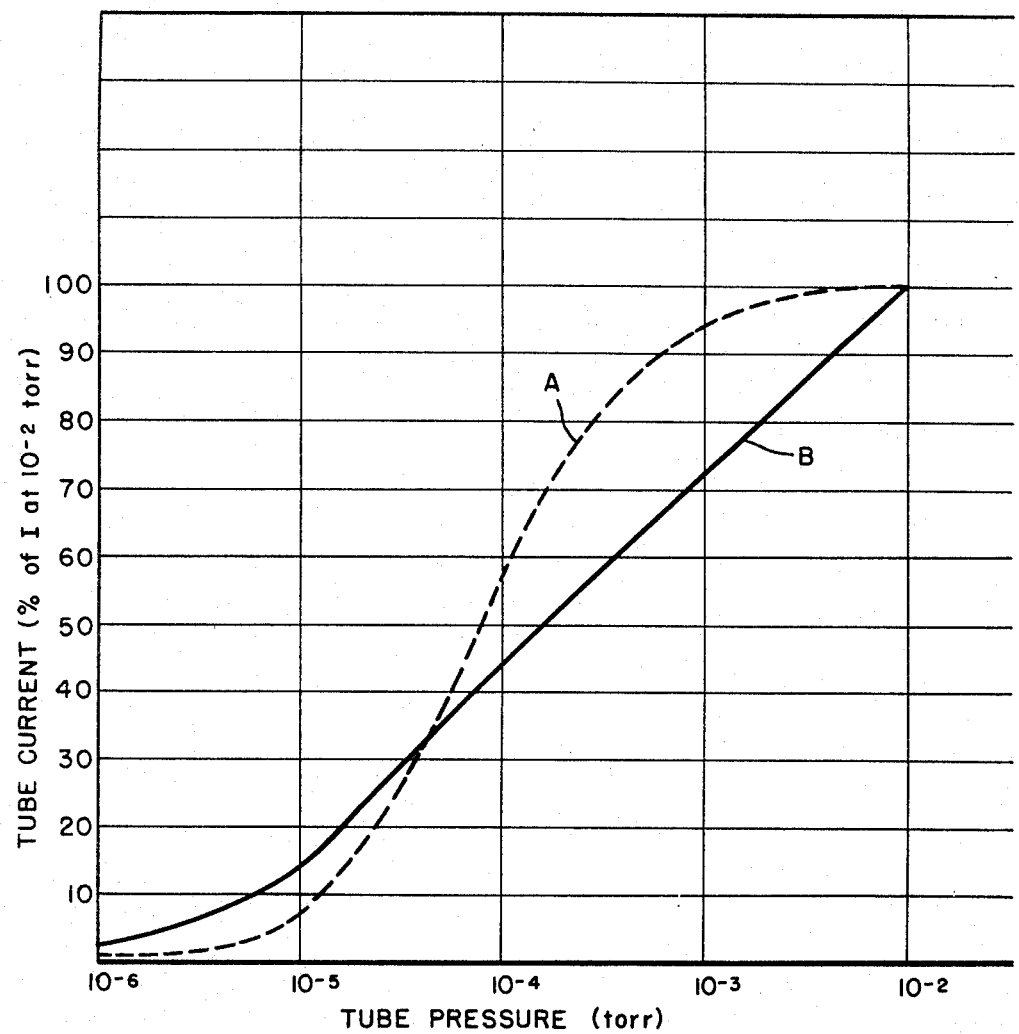

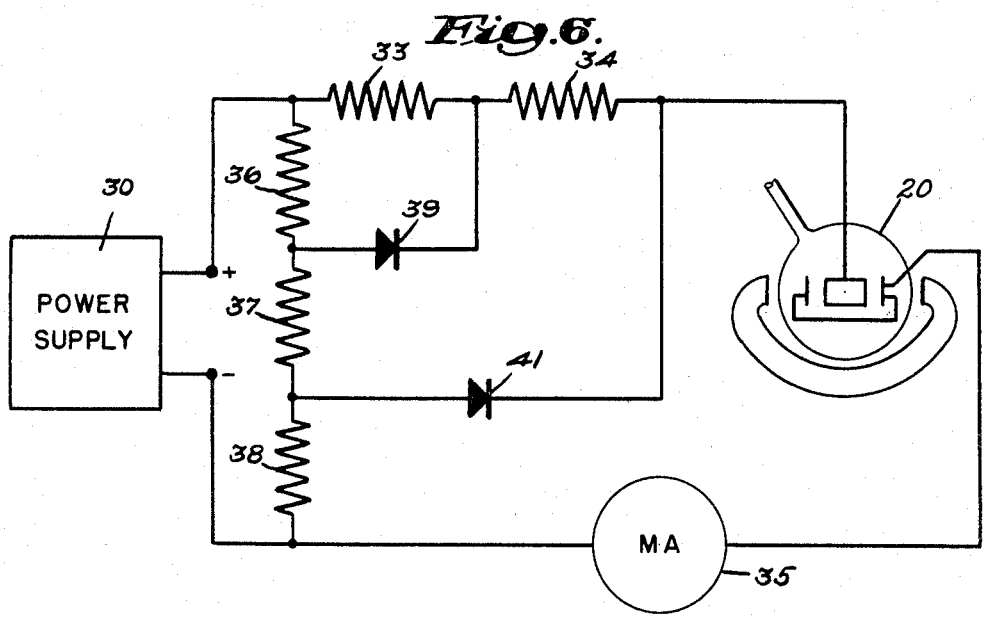
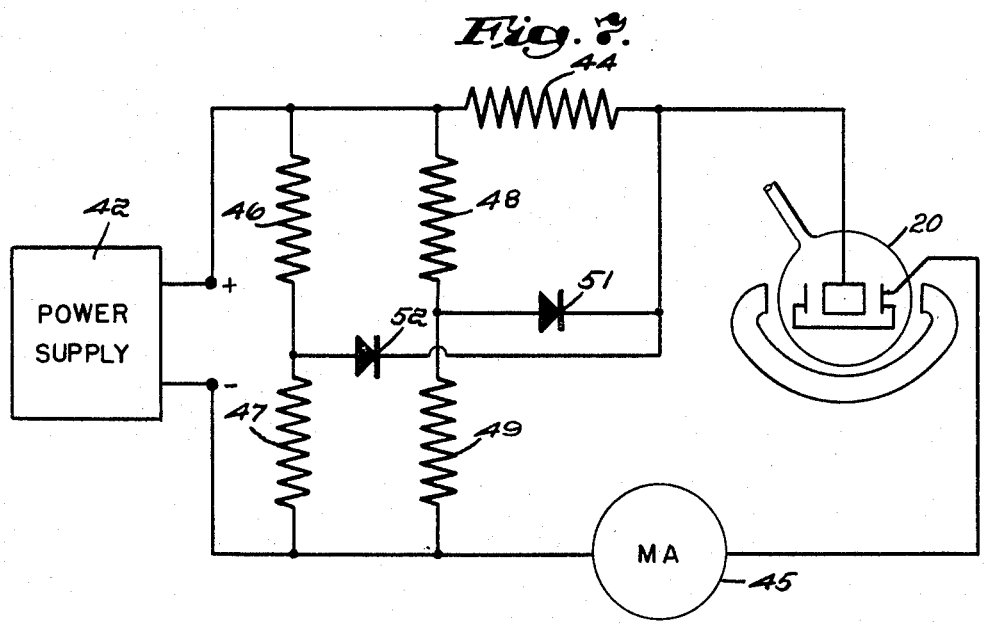

3,379,967
VACUUM GAUGE INCLUDING A COLD CATHODE IONIZATION TUBE
Peter Herrwerth, Walscheid, and Günter Reich, Cologne-Zollstock, Germany, assignors to Leybold Holding AG, a joint-stock company of Switzerland
Filed June 17, 1964, Ser. No. 376,307
9 Claims. (Cl. 324—33)

ABSTRACT OF THE DISCLOSURE

A vacuum gauge includes a cold cathode ionization tube having a protective resistor connected in series with the anode and a micro-ammeter connected in series with the cathode for measuring the tube current. The above series combination is connected across a voltage source, the positive terminal of the voltage source being connected to the anode circuit and the negative terminal to the cathode circuit. A voltage divider circuit is connected in parallel with the series combination and with the voltage source. A rectifier is connected between an intermediate point of the voltage divider circuit and a junction between the protective resistor and the anode, permitting current flow only when the potential at the junction is lower than that at the intermediate point on the voltage divider circuit. When the current through the tube increases to a certain value current flows through the rectifier circuit in parallel with the protective resistor. In a second embodiment, a second rectifier circuit is connected between a different intermediate point in the voltage divider circuit and an intermediate point on the protective resistor. In a third embodiment, a second voltage divider circuit is connected in parallel with the series combination and the first voltage divider circuit; and a second rectifier is connected between an intermediate point on the second voltage divider circuit and the junction between the protective resistor and the tube anode.

This invention relates to a vacuum gauge and more particularly to a novel vacuum gauge including cold cathode ionization apparatus.

Cold cathode ionization gauges, sometimes known as Penning gauges, have come into wide use as vacuum gauges of medium accuracy. Theoretical investigations have shown that the discharge current of a magnetically confined Penning tube is proportional to pressure from $10^{-3}$ torr to below $10^{-6}$ torr. Cold cathode gauges utilize this pressure dependent Penning tube discharge current as a measurement of pressure.

One disadvantage of the cold cathode ionization tube is that at pressures above $10^{-3}$ torr the gas discharge becomes unconfined causing an abrupt impedance change in the tube. After this change the impedance of the cold cathode tube quickly decreases to a negligible value causing the tube to draw currents which are limited only by the yield of the power supply. Such currents can produce serious damage to the cold cathode tube. To overcome this problem, cold cathode gauges have been built with power supplies having a protective series resistor which serves to limit current drawn by the gauge tube in the high pressure range.

However, the use of a protective series resistor results in a gauge tube current which is no longer proportional to pressure thereby necessitating empirical calibration of the gauge. When such a gauge is used to measure pressure between $10^{-2}$ and $10^{-6}$ torr, a high percentage of the total current change occurs between $10^{-3}$ and $10^{-5}$ torr. This is undesirable because a great majority of the meter face scale divisions then relate to the pressure region between $10^{-3}$ and $10^{-5}$ torr while the pressure ranges below $10^{-5}$ torr and above $10^{-3}$ torr are considerably condensed. Accordingly, the accuracy of meter face reading in these condensed pressure regions is relatively poor.

Two methods have been devised for overcoming this deficiency in cold cathode ionization gauges. One method is to equip the gauge meter circuit with range switching devices which provide, for example, changes in meter sensitivity in various ranges of operating pressure. Such gauges are undesirable in those instances when an investigator desires to continuously monitor the pressure in a system between $10^{-2}$ and $10^{-6}$ torr without the interruption of range switching.

It is therefore the object of this invention to provide a cold cathode ionization pressure gauge which will give continuous pressure readings between $10^{-2}$ and $10^{-6}$ torr and in which the linear change in discharge current is relatively equal for each decade change of pressure.

One feature of this invention is the provision of a cold cathode ionization pressure gauge utilizing a voltage divider in parallel with the cold cathode gauge tube and a protective series resistor and including a rectifier connected between an intermediate position on the voltage divider and the junction of the protective series resistor and the cold cathode tube.

Another feature of this invention is the provision of a cold cathode ionization gauge of the above featured type wherein the components comprising the voltage divider and the series resistor are selected so as to induce conduction by the rectifier when the pressure in the gauge tube is above a predetermined magnitude and to prevent conduction when the pressure in the gauge tube is below said predetermined magnitude.

Another feature of this invention is the provision of a cold cathode ionization gauge of the above featured type wherein the component values of the voltage divider and the series resistor are selected so that the predetermined magnitude of pressure is in the range between $10^{-2}$ and $10^{-4}$ torr.

Another feature of this invention is the provision of a cold cathode ionization gauge of the first featured type including a second rectifier element connected between a different intermediate position on the voltage divider and an intermediate position on the series resistor.

Another feature of this invention is the provision of a cold cathode ionization gauge of the first featured type including a second voltage divider connected in parallel with the first voltage divider and including an additional rectifier connected between an intermediate position on the second voltage divider and the junction of the series resistor and the cold cathode gauge tube.

These and other objects and features of the present invention will become more apparent upon an examination of the following specification taken in conjunction with the accompanying drawings, wherein:

FIG. 1 is a schematic circuit diagram of a conventional cold cathode pressure gauge with protective series resistance;

FIG. 2 is a schematic circuit diagram of a preferred cold cathode pressure gauge embodiment of the present invention showing a parallel voltage divider and connected rectifier;

FIG. 4 is a graph having pressure vs. current curves for the gauges shown in FIGS. 1 and 2 with pressure plotted logarithmically and current plotted linearly as a percent of tube current at $10^{-2}$ torr;

Figure 5:
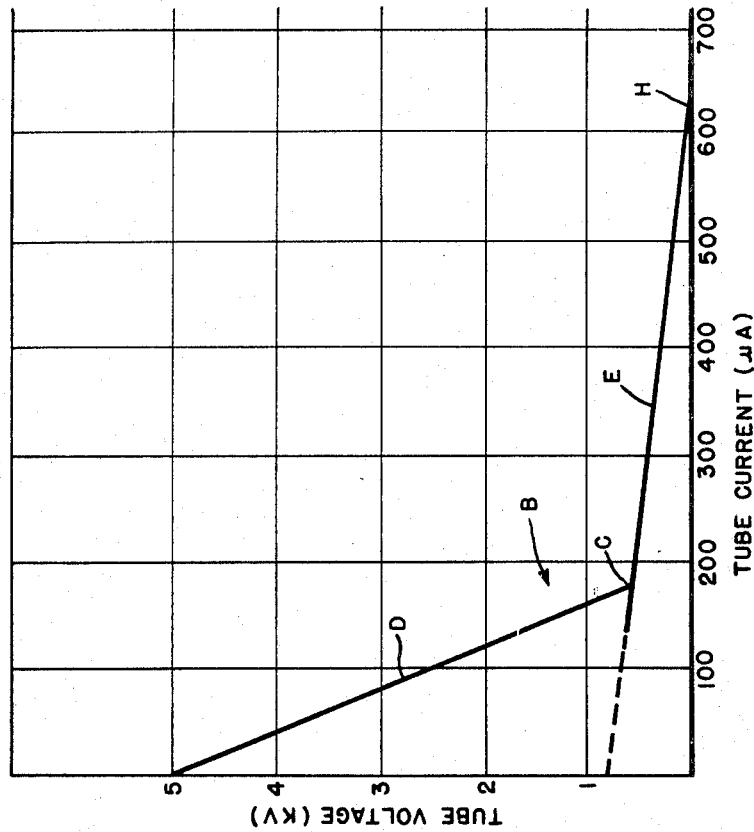
FIG. 5 is a graph having a linear plot of tube voltage vs. tube current for the gauge shown in FIG. 2.

FIG. 6 is a schematic circuit diagram of another cold cathode pressure gauge embodiment of this invention showing a plurality of rectifier components connected between the voltage divider and protective series resistance; and FIG. 7 is still another cold cathode pressure gauge embodiment of this invention showing a plurality of voltage dividers connected to the junction between the gauge tube and protective series resistor by rectifier elements.

Referring now to FIG. 1, there is shown a conventional cold cathode pressure gauge having a D.C. power supply 11 connected to the cathode tube 12, which includes an envelope having tubulation 18 for connecting the envelope to a vacuum system. The cold cathode tube 12 encloses the open ended cylindrical anode 13 connected to the positive terminal of the power supply 11 through the protective series resistor 14. Cathode plates 15 are positioned opposite the open ends of the anode 13 and are connected to the negative terminal of the power supply 11 through the micro-ammeter 16. The permanent magnet 17 provides a magnetic field through the hollow cylindrical anode 13.

To operate the cold cathode pressure gauge of FIG. 1, the cold cathode tube 12 is connected for gas communication with a vacuum system (not shown) whose pressure is to be measured. A positive voltage of several thousand volts applied to the anode 13 by the power supply 11 initiates a gas discharge between the anode 13 and the cathode plates 15. Positive ions produced by this discharge are attracted to the cathode plates 15 and the resulting ion current, which is proportional to the gas pressure within the tube 12, is indicated by the micro-ammeter 16.

Figure 3:
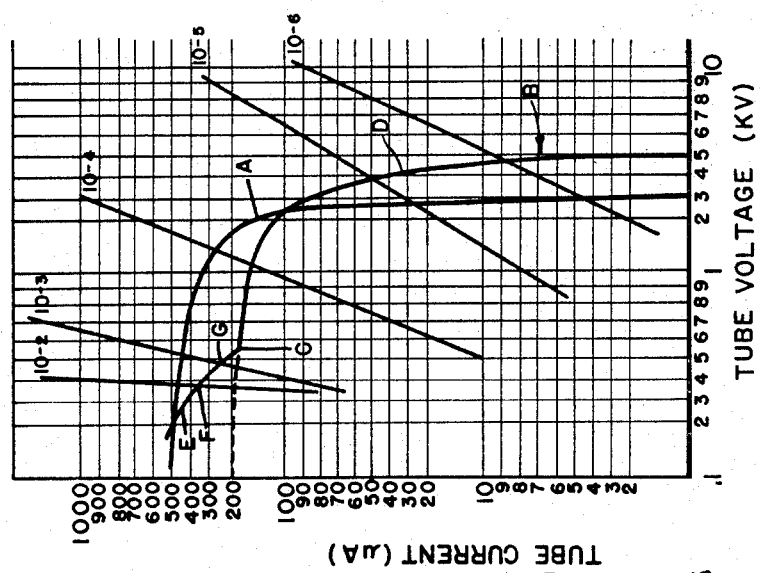
FIG. 3 is a graph having logarithmic voltage-current characteristic curves for the cold cathode gauges as shown in FIGS. 2 and 3 in addition to voltage-current characteristic curves for a typical cold cathode gauge tube along constant pressure lines of $10^{-2}$, $10^{-3}$, $10^{-4}$, $10^{-5}$, and $10^{-6}$ torr.

Curve A of FIG. 3 shows the voltage-current characteristic for the gas tube 12 in the gauge circuit of FIG. 1 with a power supply voltage of 3000 volts and a resistor 14 of $6 \times 10^6$ ohms. At very low pressures (below $10^{-6}$ torr) the effective impedance of the gauge tube 12 is extremely high so as to allow a negligible current flow. Therefore substantially all the power supply voltage of 3000 volts appears directly across the gauge tube 12. At relatively high pressures (above $10^{-2}$ torr) the effective impedance of the gauge tube 12 becomes negligible so that the current drawn by the tube is limited only by the series resistor 14 across which the entire power supply voltage appears.

Curve A as shown in FIG. 4 with system pressure plotted logarithmically as the abscissa and tube current (as percent of tube current at $10^{-2}$ torr) as the ordinate indicates the extreme condensation of current change at both ends of the pressure scale. Only 6% of the current change occurs between each of the pressure regions $10^{-2}$–$10^{-3}$ torr and $10^{-5}$–$10^{-6}$ torr while 50% occurs between $10^{-4}$–$10^{-5}$ torr and 38% between $10^{-3}$–$10^{-4}$ torr.

FIG. 2 shows a preferred embodiment of the improved cold cathode pressure gauge having a power supply 21 connected to the anode 22 of cold cathode tube 20 through the protective series resistor 23. The cold cathode tube cathodes 24 are connected to the power supply 21 through the micro-ammeter 25 and the permanent magnet 26 applies a magnetic field through the hollow cylindrical anode cell 22. Connected directly across the power supply 21 is a voltage divider consisting of series resistors 27 and 28. The rectifier 29 is connected between the junction 31 of voltage divider resistors 27, 28 and the junction 32 between protective series resistor 23 and cold cathode anode electrode 22. The envelope of tube 20 is provided with tubulation 19 for connecting the tube envelope to a vacuum system.

During operation of the cold cathode pressure gauge embodiment of FIG. 2, the gauge tube will also offer a high impedance at relatively low pressures thereby limiting current flow through the resistance 23. With limited current flow the voltage drop across the series resistor 23 will be less than the drop across the voltage divider resistance 27 thereby providing a more positive voltage at junction 32 than at junction 31 and maintaining the rectifier 29 nonconductive. However at some predetermined higher pressure, the effective impedance of the gauge tube will have reduced to such a value that the current drawn by gauge tube will produce a voltage across the series resistor 23 greater than the voltage across voltage divider resistance 27. At this time junction 31 will become positive relative to junction 32 and the rectifier 29 will become conductive connecting the voltage divider resistor 27 directly in parallel with the series protective resistor 23 and connecting the voltage divider resistor 28 in parallel with the series connected gauge tube and micro-ammeter 25.

Curve B of FIG. 3 represents the voltage-current characteristics for a gauge tube connected in the circuit of FIG. 2 with a power supply 21 of 5000 volts, a resistor 23 of $25 \times 10^6$ ohms, a resistor 27 of $11 \times 10^6$ ohms, and a resistor 28 of $1.6 \times 10^6$ ohms. Again at low pressures (below $10^{-6}$ torr) the impedance of the gauge tube is very high thereby limiting current and substantially the entire power supply voltage appears across the gauge tube. With increasing pressure in the gauge tube, its effective impedance decreases thereby permitting a greater current flow. The increased current flow increases the voltage drop across the series resistor 23 and reduces the voltage across the gauge tube. Point C represents the time at which the rectifier 29 becomes conductive and as shown produces an abrupt change in the voltage-current characteristic for the gauge tube. Finally at even higher pressures (above $10^{-2}$ torr) the effective impedance of the gauge tube becomes negligible and the current drawn thereby is limited only by the parallel combination of the series resistor 23 and voltage divider resistor 27 across which substantially the entire power supply voltage appears.

The same curve B as plotted in FIG. 4 demonstrates the greatly improved performance of the cold cathode ionization gauge of FIG. 2. As shown 28% of the total change in gauge tube current between $10^{-2}$–$10^{-6}$ torr occurs in the pressure region between $10^{-2}$–$10^{-3}$ torr, 28% between $10^{-3}$–$10^{-4}$ torr, 29% between $10^{-4}$–$10^{-5}$, and 14% between $10^{-5}$–$10^{-6}$ torr.

It will be noted by a comparison of curves A and B in FIG. 3 that merely increasing the maximum voltage across the tube and reducing the maximum tube current will provide a more nearly linear current change per logarithmic pressure change between $10^{-4}$ and $10^{-6}$ torr. However the disadvantage of merely increasing maximum voltage and decreasing maximum current is that the resultant voltage-current curve becomes even more nearly horizontal in the pressure region between $10^{-2}$–$10^{-3}$ torr. Such a curve provides an even smaller change in current for the pressure region between $10^{-2}$–$10^{-3}$ torr which region is already one of proportionally small current change. The present invention compensates for this difficulty by producing the abrupt change in the voltage-current curve at C by the action of the rectifier 29 as described above.

Referring again to FIG. 3 it can be seen that the break C in the voltage-current curve should occur in the pressure region between $10^{-2}$ and $10^{-4}$ torr if the result is to be an equalizing increase in current change between $10^{-2}$ and $10^{-3}$ torr and status quo current change between $10^{-4}$ and $10^{-5}$ torr. Preferably the break should occur between $10^{-3}$ and $10^{-4}$ torr so as to also permit equalizing of the current change in the regions between $10^{-3}$–$10^{-4}$ torr and $10^{-4}$–$10^{-5}$ torr.

The component values for the circuit of FIG. 2 can be established in several ways. For example, a suitable power supply voltage and value for resistor 23 can first be chosen. This establishes the lower portion D of the curve B in FIG. 3. These values should preferably be chosen to provide as nearly as possible a linear current change for logarithmic change of pressure in the region between $10^{-4}$ and $10^{-6}$ torr, within the practical limitations of permissible currents and voltages.

After the lower portion D of the curve B has been established, the upper portion E can be determined. This is most easily done by selecting cross-over points F and G on the equal pressure lines $10^{-2}$ and $10^{-3}$ torr which will provide the same current changes in the regions between $10^{-2}$–$10^{-3}$ and $10^{-3}$–$10^{-4}$ torr which will provide the same current changes in the regions between $10^{-2}$–$10^{-3}$ and $10^{-3}$–$10^{-4}$ torr which have already been established between $10^{-4}$ and $10^{-5}$ torr. Plotting the points F and G and the lower curve portion D on the linear voltage-current plot of FIG. 5 will establish the curve B on this graph. This in turn sets the point H at which the impedance of the gauge tube is negligible and substantially the entire power supply voltage is across the parallel resistors 23 and 27 and the point C at which the rectifier 29 becomes conductive. The resistance values required for the voltage divider resistors 27 and 28 can then be easily calculated.

FIG. 6 shows another embodiment of the present invention having a power supply 30 connected to a cold cathode pressure discharge tube 20 through series resistors 33 and 34 and a micro-ammeter 35. Connected directly across the power supply 31 is a voltage divider comprising series resistors 36, 37, and 38. A rectifier 39 is connected between the junction of voltage divider resistors 36 and 37 and the junction of series protective resistors 33 and 34. A second rectifier 41 is connected between the junction of voltage divider resistors 37 and 38 and the junction between protective series resistor 34 and the anode of cold cathode tube 32.

The operation and selection of component values for the circuit of FIG. 6 is basically the same as that described above concerning FIG. 2. The components are selected so that at some selected pressure value in the gauge tube 20 the current through the resistor 33 will produce a voltage causing the rectifier 39 to become conductive. This puts the voltage divider resistance 36 in parallel with the series resistance 33 and the voltage divider resistors 37 and 38 in parallel with the series combination of the series resistor 34, gauge tube 20, and micro-ammeter 35. At a higher pressure in the gauge tube 20, the voltage appearing across the series resistor 34 will cause the rectifier 41 to become conductive putting the voltage divider resistor 37 in parallel with the series resistor 34 and the voltage divider resistance 38 in parallel with the series circuit of the gauge tube 20 and micro-ammeter 35. With such a circuit the voltage-current characteristics of the gauge tube 20 as indicated by the micro-ammeter 35 can be refined to even a higher degree and produce an even more linear change in current for logarithmic pressure changes in the gauge tube 20.

FIG. 7 shows another embodiment of the invention having a power supply 42 connected to the cold cathode gauge tube 20 through a series protective resistor 44 and a micro-ammeter 45. Connected across the power supply 42 is a first voltage divider composed of series resistors 46 and 47 and a second voltage divider composed of series resistors 48 and 49. The rectifier 51 is connected between the junction of series protective resistor 44 and the gauge tube 20 and the junction of resistors 48 and 49. The rectifier 52 is connected between the junction of series resistor 44 and gauge tube 20 and the junction of resistors 46 and 47. The circuit components are selected so that at a certain desired pressure in the gauge tube 20 the voltage across the series resistor 44 will produce conduction by the rectifier 51. This effectively puts resistor 48 in parallel with resistor 44 and the resistor 49 in parallel with the gauge tube 20. At some higher pressure in the gauge tube 20, the voltage across the parallel circuit of resistors 44 and 48 will cause the rectifier 52 to become conductive thereby putting the voltage divider resistor 46 in parallel with the parallel combination of the resistors 44 and 48 and putting the voltage divider resistor 47 in parallel with resistor 49. With this circuit also the voltage-current characteristics can be refined to give a substantially linear change in current for logarithmic pressure changes in the gauge tube 20.

Obviously, many modifications and variations of the present invention are possible in light of the above teachings. For example only, the novel power supply can also be used with Penning type getter vacuum pumps. The performance of these devices can also be improved by power supply voltage changes in different regions of operating pressure. It is therefore to be understood that within the scope of the appended claims the invention may be practiced otherwise than as specifically described.

In the claims:

1. A vacuum gauge comprising:
   (a) a cold cathode ionization tube including, a tube envelope adapted for connection to a vacuum system, an anode and a cathode electrode enclosed by said tube envelope, and means for providing a magnetic field between said anode and cathode electrodes;
   (b) a voltage source connected across the electrodes of said cold cathode ionization tube;
   (c) current measuring means connected to measure the ionization current produced in said cold cathode ionization tube;
   (d) a protective resistor connected in series with said cold cathode ionization tube;
   (e) a voltage divider circuit connected in parallel with the series combination of said cold cathode ionization tube and said protective resistor; and
   (f) a rectifier device connected between an intermediate position of said voltage divider circuit and a junction between said protective resistor and said cold cathode ionization tube.

2. An apparatus according to claim 1 wherein said rectifier device and a portion of said voltage divider circuit are connected in parallel with said protective resistor.

3. An apparatus according to claim 2 wherein the circuit values of said protective resistor and said portion of said voltage divider circuit are such as to cause conduction by said rectifier device during periods when the current passing through said tube is above a certain magnitude, and to prevent conduction by said rectifier device during periods when the current passing through said tube is below said certain magnitude.

4. The apparatus according to claim 1 including an additional rectifier device connected between a different intermediate position of said voltage divider circuit and an intermediate position of said protective resistor.

5. An apparatus according to claim 4 wherein the circuit values of said protective resistor and said voltage divider circuit are such as to cause conduction by said additional rectifier device during periods when the current through said tube is above a certain magnitude, and to prevent conduction by said rectifier device during periods when the current through said tube is below said certain magnitude.

6. An apparatus according to claim 1 including an auxiliary voltage divider circuit connected in parallel with said voltage divider circuit, and an additional rectifier device connected between an intermediate position of said auxiliary voltage divider circuit and the junction between said protective resistor and said cold cathode ionization tube.

7. An apparatus according to claim 6 wherein said additional rectifier device and a portion of said auxiliary voltage divider circuit are connected in parallel with said protective resistor, and wherein said first-named rectifier device and a portion of said first-named voltage divider circuit are connected in parallel with said protective resistor.

8. An apparatus according to claim 7 wherein the circuit values of said protective resistor and said portion of said first-named voltage divider circuit are such as to cause conduction by said first-named rectifier device during periods when the current passing through said tube is above a certain magnitude, and to prevent conduction by said first-named rectifier device during periods when the current passing through said tube is below said certain magnitude; and wherein the circuit values of said protective resistor and said portion of said auxiliary voltage divider circuit are such as to cause conduction by said additional rectifier device during periods when the current through said tube is above a different certain magnitude, and to prevent conduction by said additional rectifier device during periods when the current through said tube is below said different certain magnitude.

9. An apparatus according to claim 1 wherein said source of voltage is a direct current power supply, said protective resistor is connected between the positive terminal of said direct current power supply and said anode electrode, and said measuring means is connected between the negative terminal of said direct current power supply and said cathode electrode.

References Cited
UNITED STATES PATENTS 2,383,600  8/1954  Grosdoff _____ 324—33
2,697,811  12/1954  Deming _____ 317—51

OTHER REFERENCES

Ives, Donald L.: "Diode Bridge Protects Meters," Electronics Engineering Edition, March 28, 1958, page 78. (Photocopy in Group 258.)

RUDOLPH V. ROLINEC, *Primary Examiner.*

C. F. ROBERTS, *Asistant Examiner.*